United States Patent
Drake et al.

(10) Patent No.: US 9,922,023 B2
(45) Date of Patent: Mar. 20, 2018

(54) PARALLEL PARSING OF FILE PARTITIONS STORING A SINGLE XML DOCUMENT

(71) Applicant: Oracle International Corporation, Redwood Shores, CA (US)

(72) Inventors: Mark Drake, San Mateo, CA (US); Dmitry Lychagin, San Jose, CA (US); Joshua Spiegel, St. Louis, MO (US)

(73) Assignee: Oracle International Corporation, Redwood Shores, CA (US)

( * ) Notice: Subject to any disclaimer, the term of this patent is extended or adjusted under 35 U.S.C. 154(b) by 360 days.

(21) Appl. No.: 14/478,876

(22) Filed: Sep. 5, 2014

(65) Prior Publication Data

US 2016/0070694 A1 Mar. 10, 2016

(51) Int. Cl.
*G06F 17/27* (2006.01)
*G06F 17/22* (2006.01)
*G06F 9/50* (2006.01)

(52) U.S. Cl.
CPC ...... *G06F 17/2705* (2013.01); *G06F 17/2247* (2013.01); *G06F 9/5011* (2013.01); *G06F 9/5066* (2013.01)

(58) Field of Classification Search
CPC ...... G06F 17/22; G06F 17/2247; G06F 17/27; G06F 17/2725
USPC .................................................. 715/234, 237
See application file for complete search history.

(56) References Cited

U.S. PATENT DOCUMENTS

| | | | |
|---|---|---|---|
| 2004/0078105 A1* | 4/2004 | Moon | G06Q 10/10 700/100 |
| 2005/0021502 A1* | 1/2005 | Chen | G06F 17/30914 |
| 2006/0123048 A1* | 6/2006 | Larson | G06F 9/45508 |
| 2007/0174852 A1* | 7/2007 | Smirnov | G06F 9/541 719/328 |
| 2009/0006944 A1* | 1/2009 | Dang | G06F 17/272 715/234 |
| 2009/0089658 A1* | 4/2009 | Chiu | G06F 17/2705 715/234 |
| 2011/0072319 A1* | 3/2011 | Agarwal | G06F 11/3604 714/49 |
| 2011/0153604 A1* | 6/2011 | Yu | G06F 17/2247 707/737 |
| 2012/0078929 A1* | 3/2012 | Agarwal | G06F 17/2247 707/756 |
| 2012/0079364 A1* | 3/2012 | Agarwal | G06F 8/456 715/234 |
| 2014/0101538 A1* | 4/2014 | Style | G06F 17/30492 715/234 |

(Continued)

OTHER PUBLICATIONS

"Large scale parallel parsing;" IBM InfoSphere DataStage, Version 8.7.0; Oct. 1, 2011; IBM.com; pp. 1-2.*

(Continued)

*Primary Examiner* — Andrew R Dyer
(74) *Attorney, Agent, or Firm* — Hickman Palermo Becker Bingham LLP (57) ABSTRACT

An XML document is stored in a file that is divided into file partitions. Each file partition is assigned to a process of a set processes to search for one or more separate target elements. The target elements are identified by a target element name. Each process scans an assigned file partition for the beginning of a target element. When a target element is found, an XML parser is invoked to parse the target element.

21 Claims, 5 Drawing Sheets

(56) References Cited

U.S. PATENT DOCUMENTS

| | | | | |
|---|---|---|---|---|
| 2014/0149851 A1* | 5/2014 | Fang | ................ | G06F 17/272 |
| | | | | 715/237 |
| 2015/0032764 A1* | 1/2015 | Lee | ................ | G06F 17/30911 |
| | | | | 707/755 |
| 2015/0363414 A1* | 12/2015 | Acharyya | ........ | G06F 17/30091 |
| | | | | 714/19 |

OTHER PUBLICATIONS

Wei Lu and Dennis Gannon; ParaXML: A Parallel XML Processing Model on the Multicore CPUs; Apr. 2008; University of Indiana; pp. 1-13.*

Ogden et al.; Scalable XML Query Processing using Parallel Pushdown Transducers; Aug. 26-30, 2013; Proceedings of the VLDB Endowment, vol. 6, No. 14; pp. 1738-1749.*

Lu et al.; A Parallel Approach to XML Parsing; 2006; Grid Computing Conference 2006; IEEE; pp. 223-230.*

Wu, Yu, Qi Zhang, Zhibiang Yu and Jianhui Li; "A Hybrid Parallel Processing for XML Parsing and Schema Validation;" Presented at Balisage: The Markup Conference 2008, Montréal, Canada, Aug. 12-15, 2008; In Proceedings of Balisage: The Markup Conference 2008. Balisage Series on Markup Technologies, vol. 1 (2008).*

* cited by examiner

PARALLEL PARSING OF FILE PARTITIONS STORING A SINGLE XML DOCUMENT

FIELD OF THE INVENTION

The present invention generally relates to computer-implemented techniques to parse XML documents and relates more particularly to parsing XML documents by parallel processing.

BACKGROUND

The use of hierarchical mark-up languages for structuring and describing data has found wide acceptance in the computer industry. An example of a mark-up language is XML.

Data structured using a hierarchical mark-up language is composed of tree nodes. Tree nodes are delimited by a pair of corresponding start and end tags, which not only delimit the tree node, but also specify the name of the tree node. For example, in the following structured data fragment,

```
<ZIPCODE>
    <CODE>95125</CODE>
    <CITY>SAN JOSE</CITY>
    <STATE>CA</STATE>
</ZIPCODE>
``` the start tag <ZIPCODE> and the end tag </ZIPCODE> delimit a tree node having name ZIPCODE.

The data between the corresponding tags is referred to as the tree node's content. A tree node's content can either be a scalar value (e.g. integer, text string), or one or more other tree nodes.

A tree node that contains another tree node is referred to herein as a structured tree node. The contained tree nodes are referred to herein as descendant tree nodes. A structured tree node thus forms a hierarchy of tree nodes with multiple levels, the structured tree node being at the top level. A tree node at each level is linked to one or more tree nodes at a different level. Any given tree node at a level below the top level is a child tree node of a parent tree node at the level above the given tree node. Tree nodes having the same parent are sibling tree nodes. A parent tree node may have multiple child tree nodes. A tree node that has no parent tree node linked to it is a root tree node, and a tree node that has no child tree nodes linked to it is a leaf tree node. For example, in structured tree node ZIPCODE, tree node ZIPCODE is the root tree node at the top level. Tree nodes CODE, CITY, and STATE are descendant and child tree nodes of ZIPCODE, and with respect to each other, tree nodes CODE, CITY and STATE are sibling tree nodes. Tree nodes CODE, CITY, and STATE are also leaf tree nodes.

In a tree node tree that represents an XML document, a tree node corresponds to an element, child tree nodes of the tree node correspond to another element contained in the element. For convenience of expression, elements and other parts of an XML document are referred to as tree nodes within a tree of tree nodes that represents the document.

A structured tree node within a structured tree node may be referred to as a subtree of the structured tree node. In XML, a structured tree node is a complex element. XML documents may contain large complex elements and subtrees. A subtree may also be referred to herein as a subdocument.

Namespace

An advantage of a mark-up language is that tags that are used to structure a document may be given names that are descriptive to humans of the tag's intended content. However, the same name may be used in many applications and contexts and the semantic for the name may vary.

To allow re-use of a name, namespaces are used. A name is referred to by qualifying the name with a namespace, thereby allowing a name to be reused.

In XML, an XML namespace may have a namespace name, such as a uniform resource identifier (URI). The namespace name may be bound to an alias, and the alias is used as a proxy for the namespace name, and may be used to qualify names of elements in an XML document. A namespace is declared for an element, and the scope of the namespace is the element and the element's descendants.

The following XML document DOC is used to illustrate namespaces.

```
<DOC....>
    <ACCT:CUSTOMER
    xmlns:ACCT="HTTP://WWW.MY.COM/ACCT-REV10">
        <ACCT:NAME>CORPORATION</ACCT:NAME>
        <ACCT:ORDER ACCT:REF="5566"/>
        <ACCT:STATUS>INVOICE</ACCT:STATUS>
    </ACCT:CUSTOMER>
    <FUL:CUSTOMER
    xmlns:FUL="HTTP://WWW.YOUR.COM/FUL">
        <FUL:NAME>CORPORATION</FUL:NAME>
        <FUL:ORDER FUL:REF="A98756"/>
        <FUL:STATUS>SHIPPED</FUL:STATUS>
    </FUL:CUSTOMER>
</DOC>
```

The element ACCT:CUSTOMER declares the namespace HTTP://WWW.MY.COM/ACCT-REV10, through use of the XML reserved keyword xmlns, and declares ACCT as a prefix or alias for the namespace. This prefix is used to qualify the names of elements ACCT:CUSTOMER, ACCT:ORDER, ACCT:NAME, and ACCT:STATUS. The scope of namespace ACCT namespace is element ACCT:CUSTOMER and does not extend to element FUL:CUSTOMER.

The element FUL:CUSTOMER declares the namespace HTTP://WWW.YOUR.COM/FUL, and declares FUL as a prefix or alias for the namespace. This prefix is used to qualify the names in elements FUL:CUSTOMER, FUL:NAME, FUL:ORDER, and FUL:STATUS.

Parsing XML Documents

An XML parser is a software component that takes XML data and generates data representing the structure and/or content of XML data. There are at least two types of XML parsers, streaming-event parser and a DOM (Document Object Model) parser.

A DOM parser uses tree-traversal-based parsing to build an object tree in memory representing the XML document. The object tree is referred to herein as a DOM. The DOM allows complete, dynamic access to an entire XML document through an object-oriented API. Because the XML document is represented in memory as an object tree, DOM parsers preserve and allow dynamic access to the XML document structure and content.

A streaming-event parser may also use tree-traversal-based parsing. However, the streaming-event parser generates "parsing" events encountered during the traversal of an XML document. Example events include encountering a beginning of an element or end of an element.

Large datasets are frequently packaged as large XML documents. Parsing large XML documents expends a lot of time. Described herein are techniques for more quickly parsing large XML documents.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DESCRIPTION OF EXAMPLE EMBODIMENTS

Techniques for parsing XML documents by parallel processing are described. In the following description, for the purposes of explanation, numerous specific details are set forth in order to provide a thorough understanding of the present invention. It will be apparent, however, that the present invention may be practiced without these specific details. In other instances, structures and devices are shown in block diagram form in order to avoid unnecessarily obscuring the present invention.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in the specification.

Overview

Techniques for parsing a single XML document in parallel are described herein. These techniques are referred to herein as Parallel Single Document Parsing. According to the techniques, an XML document is stored in a file ("XML file"). The XML file is divided, at least logically, into file partitions.

Each file partition is assigned to a process of a set processes to search for one or more separate target elements. The target elements are identified by a target element name. Each process scans an assigned file partition for the beginning of a target element. When a target element is found, an XML parser is invoked to parse the target element.

In an embodiment, to parse an XML document properly, a target element is parsed once and only by one process among the set of processes. A target element may start in one file partition and extend into another file partition. In this case, the process parsing the target element parses XML data not only from the one file partition and but also from the other file partition. Parsing into another file partition in this way is referred to as partition spill over. Even when partition spill over occurs for a target element, only one process parses a target element. A parser assigned to the other file partition would not have found the beginning of the target element and never would not have begun parsing the target element.

After the target element has been parsed by the XML parser, it is determined if the end of the file partition has been reached. If the end of the file partition has not been reached, the partition is further scanned for another target element. If the end of the partition is reached, processing of the document section ends.

When a process begins scanning a file partition, it may begin scanning at a point in the XML document where a namespace is in scope but beyond the point (in document order) where the namespace is declared. Parsing XML documents requires correctly determining and tracking which namespaces are in scope at a particular point in an XML document. Thus, when a process is assigned a file partition to scan, any namespace that should be in scope for an ascendent of a target element is provided as input.

Parallel Single Document Parsing can be advantageously used in a variety of scenarios. For example, a large data set may contain multiple XML documents packaged as subdocuments within a larger XML document. Each subdocument can be treated as a target element under Parallel Single Document Parsing allowing each to be parsed in parallel with other subdocuments. The structure of the larger XML document is known, at least to an extent necessary to determine which namespaces should be in scope for any ascendent of a desired target element.

Overview of Example Embodiment

An embodiment of the present invention is preferably implemented using a distributed file system to store files that contain XML, documents. In a distributed file system, storage of a file may be distributed across multiple storage media devices (e.g. commodity disk drives). An example of a distributed of file system is a HADOOP Distributed File System. A distributed file system may comprise many storage media devices and processors. For purposes exposition, an embodiment of the present invention is illustrated in a computer environment having a smaller scale than is expected for many embodiments of the present invention.

Figure 1:
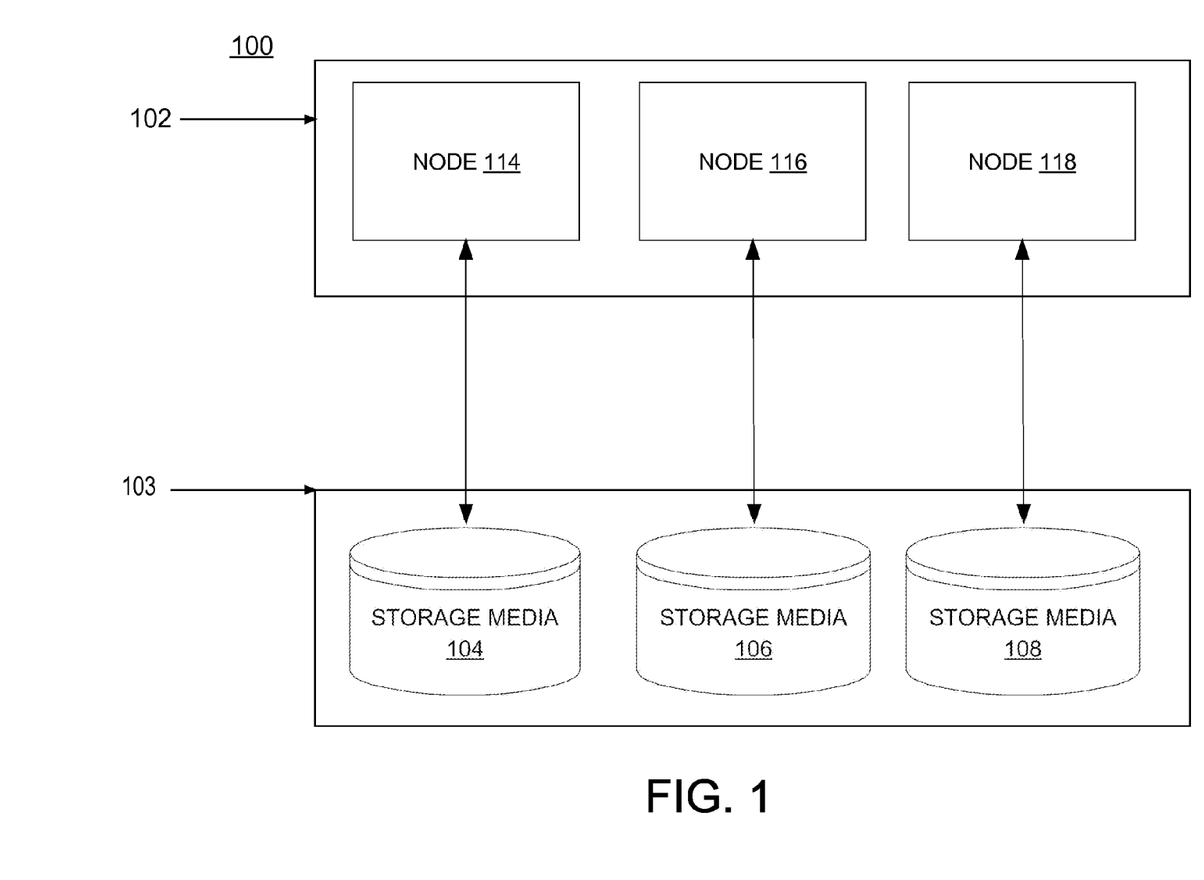
FIG. 1 illustrates an example computer environment with which an embodiment may be implemented.

FIG. 1 illustrates an example computer environment used to illustrate Parallel Single Document Parsing. Referring to FIG. 1, computer system 100 has multiple computing nodes 102 and multiple storage devices 103. The computing nodes 102 include computing node 114, computing node 116, and computing node 118.

A computing node comprises one or more CPUs. A computing node may be, for example, a separate computer system or server blade of a grid of server blades, or may be on the same server blade, or a combination thereof. The computing nodes are communicatively coupled directly or indirectly through one or more networks, for example, a service provider network, or other internetworking elements.

Computing nodes 102 access data stored in storage device 103. A storage device 103 comprises storage media device 104, storage media device 106, and storage media device 108.

In an embodiment, storage device 103 stores data in a distributed file system implemented on storage device 103. For a given file, multiple segments of a file are each stored in a separate storage media device. Each segment comprises a contiguous portion (within an address space) of data in the file.

Each of computing node 114, computing node 116, and computing node 118 has direct access to one of storage media devices 104, 106, and 108, and indirect access to another of storage media devices 104, 106, and 108. By having "direct access", it is meant that a computing node may issue an I/O request for data in a storage media device without having to direct the request to another computing node. By "indirect access", it is meant that a computing node may access the data in a storage media device only by issuing a request to another computing node for such access. Generally, a computing node may directly access data more efficiently than indirectly access.

For example, computing node 114 has direct access to storage media device 104 and indirect access to storage media device 106 and storage media device 108. Computing node 116 has direct access to storage media device 106 and indirect access to storage media device 104 and storage media device 108. Computing node 114 may issue an I/O request for data to storage media device 104 without having to issue a request for the data to computing node 116. However, to access data in storage media device 106, computing node 114 must issue a request for the data to computing node 116.

In another embodiment, each of computing node 114, computing node 116, and computing node 118 may share direct access to one or more of storage media device 106, and storage media device 108. For example, computing node 114, computing node 116, and computing node 118 each has direct access to storage media device 104, storage media device 106, and storage media device 108.

In an embodiment, storage device 103 stores a large XML document in a file referred to herein as an XML file within the distributed file system of storage device 103. Each segment is stored on one of storage media device 104, storage media device 106, and storage media device 108.

Figure 2:
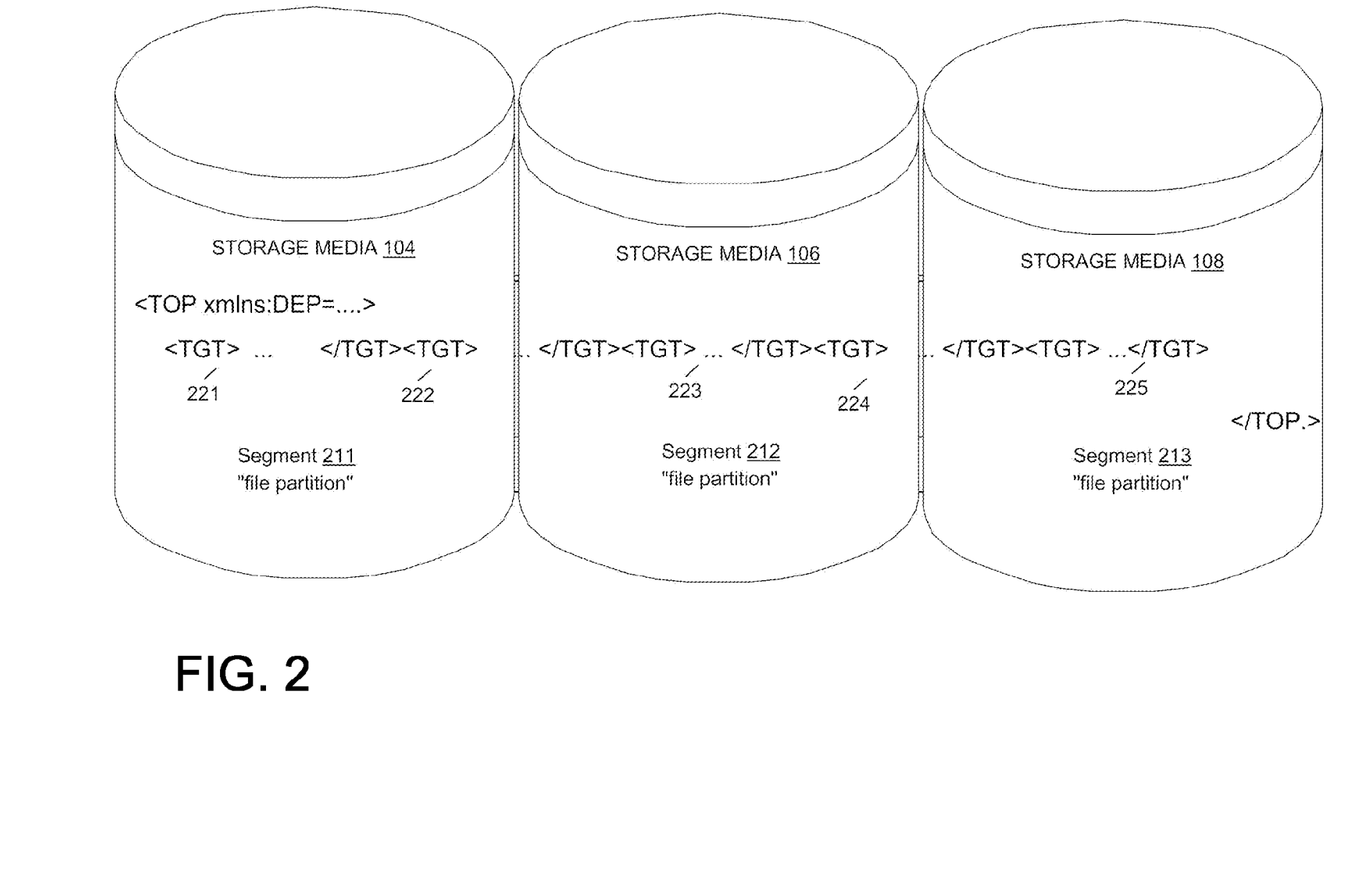
FIG. 2 illustrates an XML document stored in a distributed file to be parsed according to an embodiment of the present invention.

FIG. 2 illustrates an XML document TOP stored in XML file 210. XML file 210 is segmented into segments 211, 212, and 213, each of which is stored in storage media device 104, storage media device 106, and storage media device 108, respectively. TOP contains multiple elements TGT, which may be stored in one or more segments of XML file 210. TGT 221 is stored in segment 211; element TGT 222 is stored in segment 211 and 212; element TGT 223 is stored in segment 212; element TGT 224 is stored in segment 212 and segment 213; element TGT 225 is stored in segment 213.

Element TOP declares a namespace with an alias of DEP. Elements TGT are within the scope of DEP.

Storage device 103 is configured to respond to requests to report "file mapping information" for a file, which includes the file location within the file corresponding to each segment of a file, and a computing node with direct access to the storage device holding each segment. The file location within a file may be an offset and a size of the segment. For example, a client running on computing node 114 may request the location of segments for XML file 210. In response, storage device 103 returns for each segment 211, 212, and 213, a computing node with direct access (i.e. computing node 114, 116, and 118, respectively) and an offset within XML file 210 and a size, such as 64 MB.

Process Flow for Parsing a Partitioned XML Document

Figure 3:
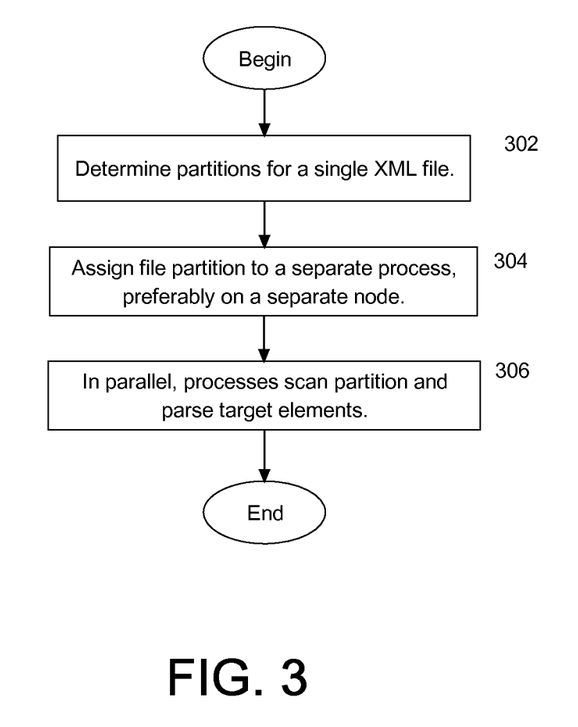
FIG. 3 illustrates a process for parsing a single XML document in parallel according to an embodiment of the present invention.

FIG. 3 illustrates a procedure for parsing an XML document stored in a file of a distributed file system using Parallel Single Document Parsing. For the purposes of illustration, the procedure flow depicted in FIG. 3 is discussed using computer system 100 and XML file 210. As shall be explained, each file partition of XML file 210 is assigned to a single process running on computing node 114, computing node 116, or computing node 118 for processing. The term process refers to a computer system process, which is described below in the section Hardware Overview.

Referring now to FIG. 3, at 302, computer system 100 determines file partitions for XML file 210. In an embodiment, only one file partition is established for each segment of XML file 210. The segments of XML file 210 are determined by issuing a request to storage device 103 for file mapping information about XML file 210.

Establishing one file partition per segment increases efficiency by promoting use of direct access and I/O isolation. For example, when a segment of an XML file corresponding to a file partition on a storage media device is assigned to a single process and computing node, I/O for the storage media device may be isolated to direct access by that one computing node for at least a portion of the time a file partition is being processed by the single process. In the current illustration, one and only one file partition is established for each segment 211, 212, and 213.

At 304, partitions are assigned to processes for scanning and parsing. In an embodiment, to promote direct access, I/O isolation, and parallel processing, each file partition is assigned to a single process on a separate computing node that directly accesses the storage media device that stores the file partition. The assignment of processes is based on file mapping information regarding which computing nodes have direct access to which storage media devices.

In the current illustration, a process on computing node 114 is assigned to the file partition based on segment 211, a process on computing node 116 is assigned to the file partition based on segment 212, and a process on computing node 118 is assigned to the file partition based on segment 213.

Next, at block 306, each process assigned a file partition scans and parses the file partition assigned, thereby scanning and parsing in parallel the assigned file partition with other processes scanning and parsing other file partitions. The procedure followed by the processes to scan and process file partitions is depicted in FIG. 4.

Figure 4:
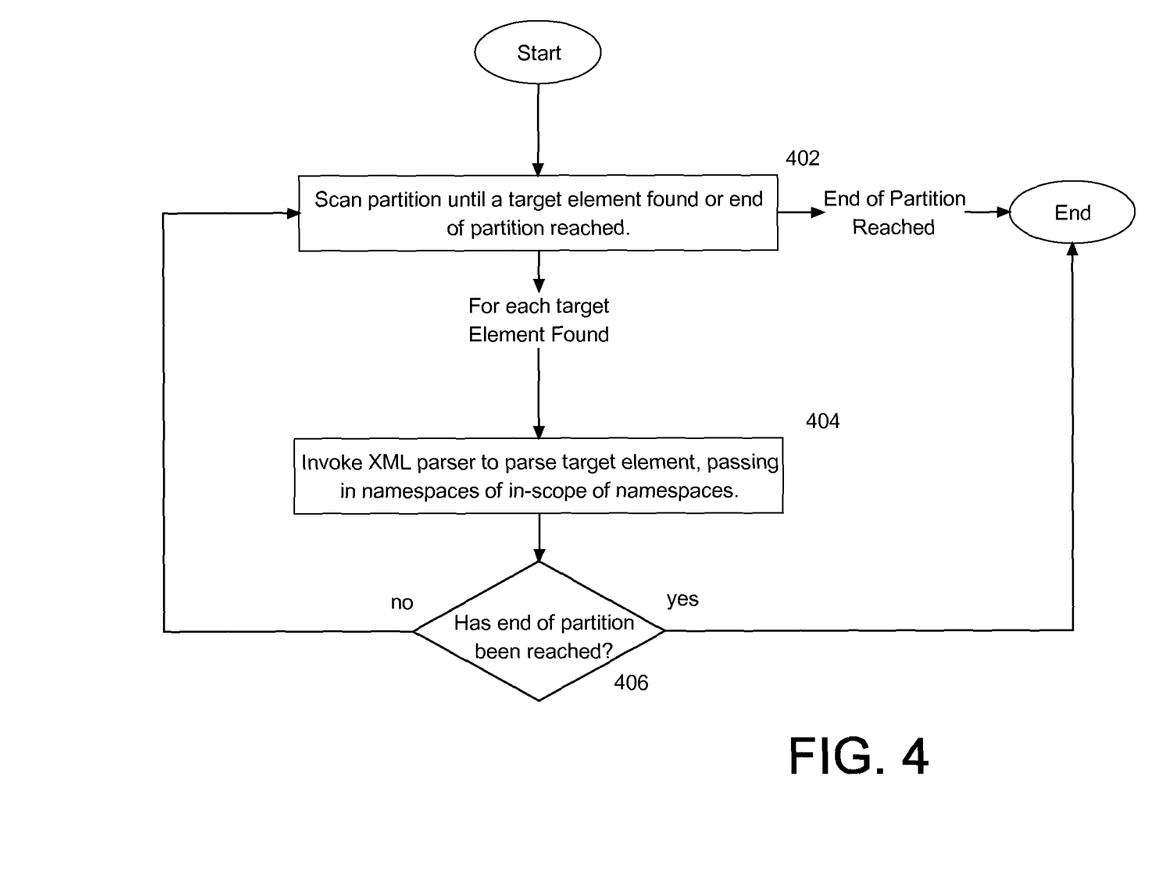
FIG. 4 illustrates a process for parsing a single XML document in parallel according to an embodiment of the present invention.

Referring to FIG. 4, at 402 a process scans a partition. When during scanning of a partition a target element is found, at 404, an XML parser is invoked to parse the target element. Invoking a parser includes passing the namespaces that are in scope for ascendents of the target element. The target element is scanned as if the namespaces are in scope.

When parsing is completed, at 406, it is determined whether parsing ended before the end of the partition. If so, the procedure returns to 402 and scanning starts again. Otherwise, the procedure ends. Note that parsing can lead to parsing portions of a target element in another file partition. Parsing, not scanning, determines when the end of a target element is reached.

The operation of scanning for a target element differs from the operation of parsing a target element. Scanning, like parsing, involves interpreting the data in an XML file to find element tags. However, scanning may not entail many kinds of operations performed by parsing. For example, scanning may not generate data representing hierarchical structure or content of elements (e.g. DOM, parsing events) encountered during scanning, or check for proper syntax and/or report improper syntax.

Establishing file partitions is not limited to establishing one separate file partition for each segment of an XML file. In an embodiment, a file partition may be established for multiple segments, or multiple file partitions may be established for a segment, each of the multiple file partitions corresponding to different portions of the segment.

In addition, more file partitions may be established than there are computing nodes to process an XML file. In such a scenario, a computing node may be assigned one file partition at a time. When a computing node finishes processing a file partition, the computing node is assigned an unprocessed file partition to process.

Constraints & Caveats

According to an embodiment of the present invention, XML files parsed using Parallel Single Document Parsing should comply with one or more constraints.

CDATA, COMMENTS, & PROCESSING INSTRUCTION SHOULD NOT INCLUDE A TARGET ELEMENT: CDATA is character data and should not be treated as marked-up data. Similarly, comments and processing instructions may include text that should be ignored by an XML parser as XML document content. To avoid parsing text in CDATA, comments and processing instructions as a target element, CDATA, comments and processing instructions should not contain text marked-up like a target element.

NO TARGET ELEMENT SHOULD BE NESTED IN ANOTHER TARGET ELEMENT: Without this constraint, it is possible that a target element could be parsed multiple times. For example, assume TGT 223 is nested within TGT 222. A process scanning and parsing the partition corresponding segment 211 would parse TGT 222 and TGT 223. A process scanning and parsing the partition corresponding to segment 212 would also parse TGT 223.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
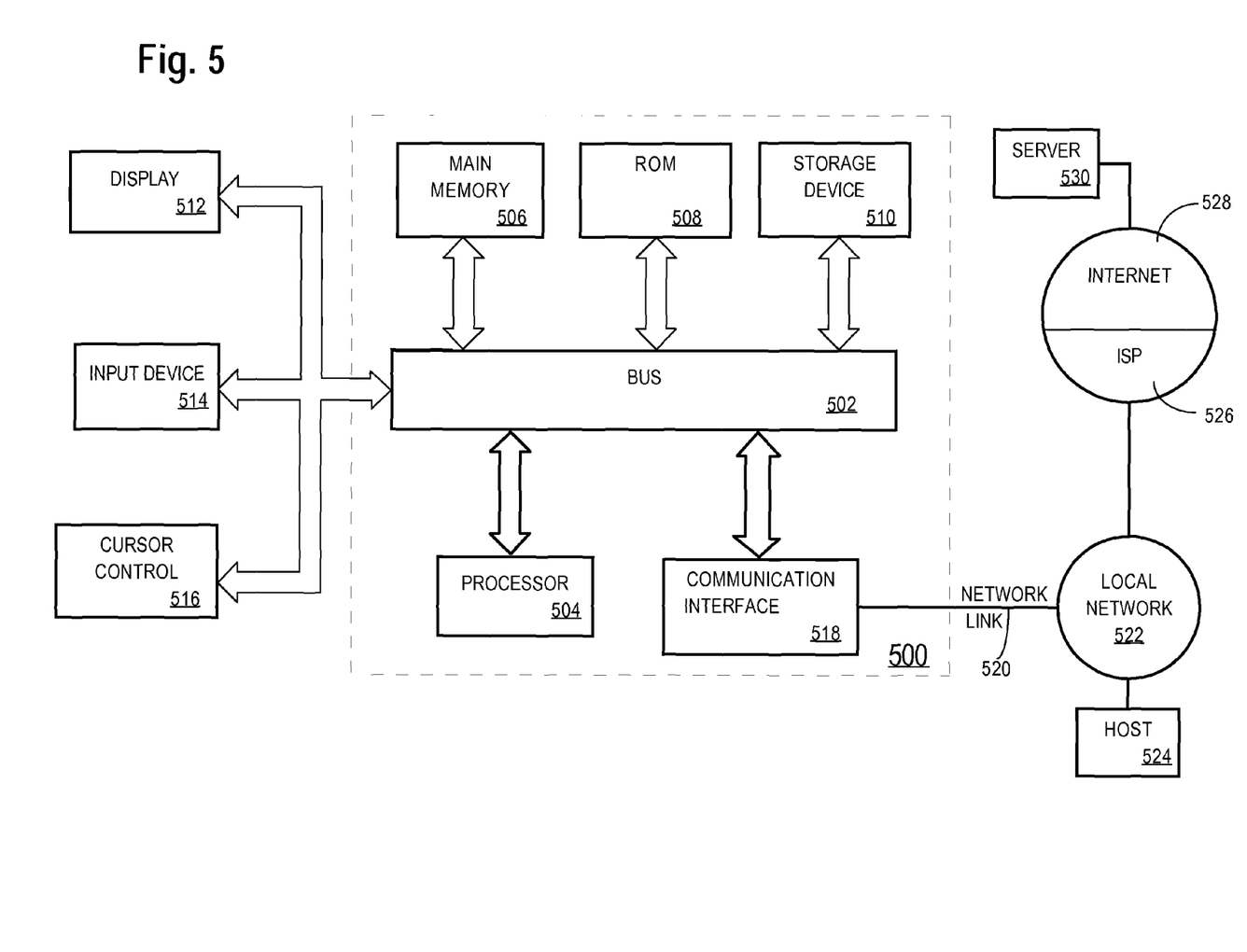
FIG. 5 illustrates a block diagram for a computer system upon which an embodiment may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. A computer system process comprises an allotment of processor time, and an allotment of memory (physical and/or virtual), the allotment of memory being for storing instructions executed by the processor, for storing data generated by the processor executing the instructions, and/or for storing the processor state (e.g. content of registers) between allotments of the processor time when the computer system process is not running. Computer system processes run under the control of an operating system, and may run under the control of other programs being executed on the computer system.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method for parsing at least a portion of an XML document in parallel, comprising steps of:
    assigning a plurality of file partitions of an XML file that contains said XML document to a plurality of computing nodes by, for each computing node of the plurality of computing nodes, assigning to said each computing node a respective target element of said XML document and a respective file partition of said plurality of file partitions;
    in parallel with other computing nodes of said plurality of computing nodes, each computing node of said plurality of the computing nodes:
        receiving input specifying the respective target element by name and respective file partition;
        scanning the respective file partition for a beginning of the respective target element; and
        when the beginning of the respective target element is found, said each computing node parsing the respective target element;
    wherein assigning a plurality of file partitions to a plurality of computing nodes includes assigning a first file partition of said plurality of file partitions to a first computing node of said plurality of computing nodes and assigning a second file partition of said plurality of file partitions to a second computing node of said plurality of computing nodes;
    wherein the respective target element of the first computing node starts in the first file partition and extends into the second file partition; and
    wherein the first computing node parsing the respective target element comprises the first computing node parsing the respective target element from the first file partition and second file partition.

2. The method of claim 1,
    wherein said XML file is a distributed file stored in a distributed file system comprising a plurality of storage media devices; and
    wherein said XML, file comprises segments, wherein each segment of said segments is stored on a separate respective storage media device of said plurality of storage media devices; and
    the steps further including establishing a file partition of said file partitions for each segment of said segments.

3. The method of claim 2, wherein a respective storage media device that stores each segment of said segments is directly accessible by a computing node of said plurality of computing nodes;
    wherein other storage media devices of said plurality of storage media devices are not directly accessible by said computing node of said plurality of computing nodes.

4. The method of claim 1, wherein for each computing node of said plurality of computing nodes, the input specifying the respective target element and respective file partition further specifies one or more names spaces in scope for the respective target element.

5. The method of claim 1, wherein any target element assigned by said assigning is not nested within any other target element assigned by said assigning.

6. The method of claim 1,
    wherein for each computing node of said plurality of computing nodes, the input specifying the respective target element by name and respective file partition further specifies names spaces in scope for the respective target element;

wherein said XML document satisfies a set of constraints comprising at least one of:
any CDATA does not contain data marked up as a target element;
any comment does not contain data marked up as a target element; and
any processing instruction does not contain data marked up as a target element.

7. The method of claim 1, wherein said XML file is stored in distributed file system that comprises said plurality of computing nodes and a plurality of storage media devices.

8. One or more non-transitory storage media storing instructions for parsing at least a portion of an XML document in parallel, said instructions which, when executed by one or more computing devices, cause:
assigning a plurality of file partitions of an XML file that contains said XML document to a plurality of computing nodes by, for each computing node of the plurality of computing nodes, assigning to said each computing node a respective target element of said XML document and a respective file partition of said plurality of file partitions; and
in parallel with other computing nodes of said plurality of computing nodes, each computing node of said plurality of the computing nodes:
receiving input specifying the respective target element by name and respective file partition,
scanning the respective file partition for a beginning of the respective target element, and
when the beginning of the respective target element is found, said each computing node parsing the respective target element;
wherein assigning a plurality of file partitions to a plurality of computing nodes includes assigning a first file partition of said plurality of file partitions to a first computing node of said plurality of computing nodes and assigning a second file partition of said plurality of file partitions to a second computing node of said plurality of computing nodes;
wherein the respective target element of the first computing node starts in the first file partition and extends into the second file partition; and
wherein the first computing node parsing the respective target element comprises the first computing node parsing the respective target element from the first file partition and second file partition.

9. The one or more non-transitory storage media of claim 8,
wherein said XML file is a distributed file stored in a distributed file system comprising a plurality of storage media devices; and
wherein said XML, file comprises segments, wherein each segment of said segments is stored on a separate respective storage media device of said plurality of storage media devices; and
wherein said instructions include instructions that, when executed by said one or more computing devices, cause: establishing a file partition of said file partitions for each segment of said segments.

10. The one or more non-transitory storage media of claim 9, wherein a respective storage media device that stores each segment of said segments is directly accessible by a computing node of said plurality of computing nodes;
wherein other storage media devices of said plurality of storage media devices are not directly accessible by said computing node of said plurality of computing nodes.

11. The one or more non-transitory storage media of claim 8, wherein for each computing node of said plurality of computing nodes, the input specifying the respective target element and respective file partition further specifies one or more namesspaces in scope for the respective target element.

12. The one or more non-transitory storage media of claim 9, wherein any target element assigned by said assigning is not nested within any other target element assigned by said assigning.

13. The one or more non-transitory storage media of claim 8,
wherein for each computing node of said plurality of computing nodes, the input specifying the respective target element by name and respective file partition further specifies names spaces in scope for the respective target element; and
wherein said XML document satisfies a set of constraints comprising at least one of:
any CDATA does not contain data marked up as a target element,
any comment does not contain data marked up as a target element a target element, and
any processing instruction does not contain data marked up as a target element a target element.

14. The one or more non-transitory storage media of claim 8,
wherein said XML file is stored in a distributed file system that comprises said plurality of computing nodes and a plurality of storage media devices.

15. A computer system including one or more processors comprising:
one or more computing nodes configured to parse at least a portion of an XML document in parallel, wherein each of the one or more computing nodes is configured to:
receive assignment of a respective target element of said XML document and a respective file partition of a plurality of file partitions of an XML file that contains said XML document;
in parallel with other computing nodes of said one or more computing nodes:
receive input specifying the respective target element by name and respective file partition;
scan the respective file partition for a beginning of the respective target element; and
parse the respective target element, when the beginning of the respective target element is found;
wherein assigning a plurality of file partitions to a plurality of computing nodes includes assigning a first file partition of said plurality of file partitions to a first computing node of said plurality of computing nodes and assigning a second file partition of said plurality of file partitions to a second computing node of said plurality of computing nodes;
wherein the respective target element of the first computing node starts in the first file partition and extends into the second file partition; and
wherein the first computing node parsing the respective target element comprises the first computing node parsing the respective target element from the first file partition and second file partition.

16. The system of claim 15,
wherein said XML file is a distributed file stored in a distributed file system comprising a plurality of storage media devices; and
wherein said XML, file comprises segments, wherein each segment of said segments is stored on a separate respective storage media device of said plurality of storage media devices; and wherein each of the one or more computing nodes is further configured to: establish a file partition of said file partitions for each segment of said segments.

17. The system of claim 16, wherein a respective storage media device that stores each segment of said segments is directly accessible by a computing node of said one or more computing nodes;

wherein other storage media devices of said plurality of storage media devices are not directly accessible by said computing node of said plurality of computing nodes.

18. The system of claim 15, wherein for each computing node of said one or more computing nodes, the input specifying the respective target element and respective file partition further specifies one or more names spaces in scope for the respective target element.

19. The system of claim 15, wherein any target element assigned by said assigning is not nested within any other target element assigned by said assigning.

20. The system of claim 15, wherein for each computing node of said one or more computing nodes, the input specifying the respective target element by name and respective file partition further specifies names spaces in scope for the respective target element.

wherein said XML document satisfies a set of constraints comprising at least one of:

any CDATA does not contain data marked up as a target element;

any comment does not contain data marked up as a target element a target element; and any processing instruction does not contain data marked up as a target element a target element.

21. The system of claim 15, wherein said XML file is stored in a distributed file system that comprises said one or more computing nodes and a plurality of storage media devices.

* * * * *

UNITED STATES PATENT AND TRADEMARK OFFICE
CERTIFICATE OF CORRECTION

PATENT NO. : 9,922,023 B2
APPLICATION NO. : 14/478876
DATED : March 20, 2018
INVENTOR(S) : Drake et al.

Page 1 of 2

It is certified that error appears in the above-identified patent and that said Letters Patent is hereby corrected as shown below:

In the Specification

In Column 4, Line 35, delete "XML," and insert -- XML --, therefor.

In Column 6, Line 4, delete "section" and insert -- section. --, therefor.

In the Claims

In Column 10, Line 40, in Claim 2, delete "XML," and insert -- XML --, therefor.

In Column 11, Line 10, in Claim 7, delete "in distributed" and insert -- in a distributed --, therefor.

In Column 11, Line 52, in Claim 9, delete "XML," and insert -- XML --, therefor.

In Column 12, Line 5, in Claim 11, delete "namesspaces" and insert -- names spaces --, therefor.

In Column 12, Lines 6-7, in Claim 12, delete "claim 9," and insert -- claim 8, --, therefor.

In Column 12, Lines 21-22, in Claim 13, delete "a target element a target element" and insert -- a target element --, therefor.

In Column 12, Line 24, in Claim 13, delete "a target element a target element" and insert -- a target element --, therefor.

In Column 12, Line 66, in Claim 16, delete "XML," and insert -- XML --, therefor.

In Column 14, Line 6, in Claim 20, delete "element." and insert -- element, --, therefor.

In Column 14, Lines 12-13, in Claim 20, delete "a target element a target element" and insert -- a target element --, therefor.

Signed and Sealed this
Twenty-first Day of August, 2018

Andrei Iancu
*Director of the United States Patent and Trademark Office*

CERTIFICATE OF CORRECTION (continued)
U.S. Pat. No. 9,922,023 B2

In Column 14, Line 15, in Claim 20, delete "a target element a target element" and insert -- a target element --, therefor.